(12) United States Patent
Kanakubo et al.

(10) Patent No.: US 8,570,685 B1
(45) Date of Patent: Oct. 29, 2013

(54) WAFER FOR MAGNETIC HEAD AND METHOD FOR MANUFACTURING THE SAME

(75) Inventors: Katsuya Kanakubo, Tokyo (JP); Kenji Senga, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 13/448,782

(22) Filed: Apr. 17, 2012

(51) Int. Cl.
*G11B 5/127* (2006.01)

(52) U.S. Cl.
USPC .................................... 360/125.1; 29/603.07

(58) Field of Classification Search
USPC ............... 360/125.03, 125.1, 125.11, 125.14, 360/125.3, 317; 29/603.07, 603.13, 603.23
See application file for complete search history.

(56) References Cited

U.S. PATENT DOCUMENTS

| | | | | |
|---|---|---|---|---|
| 5,282,308 A * | 2/1994 | Chen et al. | .................. | 29/603.18 |
| 5,801,910 A * | 9/1998 | Mallary | .................... | 360/125.65 |
| 6,016,242 A * | 1/2000 | Mastain et al. | .......... | 360/125.64 |
| 6,381,833 B1 * | 5/2002 | Mastain et al. | ............. | 29/603.12 |
| 6,525,904 B1 * | 2/2003 | Sasaki | ...................... | 360/125.65 |
| 7,133,255 B2 * | 11/2006 | Lille et al. | ................. | 360/125.56 |
| 7,141,357 B2 * | 11/2006 | Sasaki et al. | .................. | 430/320 |
| 7,239,480 B2 * | 7/2007 | Hirabayashi et al. | ..... | 360/125.37 |
| 7,433,151 B2 * | 10/2008 | Sasaki et al. | ............. | 360/125.03 |
| 7,558,020 B2 * | 7/2009 | Sasaki et al. | ............. | 360/125.14 |
| 7,978,432 B2 * | 7/2011 | Sasaki et al. | ............. | 360/125.42 |
| 8,163,186 B2 * | 4/2012 | Sasaki et al. | .................... | 216/22 |
| 8,169,740 B2 * | 5/2012 | Sasaki et al. | ............... | 360/125.1 |
| 2007/0155188 A1 | 7/2007 | Kamijima | | |

FOREIGN PATENT DOCUMENTS

| | | |
|---|---|---|
| JP | 2007-279373 | 10/2007 |
| JP | 2008-181611 | 8/2008 |

* cited by examiner

*Primary Examiner* — Angel Castro
(74) *Attorney, Agent, or Firm* — Oblon, Spivak, McClelland, Maier & Neustadt, L.L.P.

(57) ABSTRACT

A wafer for a magnetic head includes a magnetic pole which has a design capable of avoiding pole missing due to processing with an improved resistance to the processing during a magnetic pole forming process. Each magnetic head element provided in the wafer has a recording magnetic pole film. The magnetic pole film has a large width part, a small width part and a support part. The small width part projects continuously from the large width part and extends with a constant width W1, while the support part is continuous with an end of the small width part and has a width W2. The width W1 and the width W2 satisfy the relationship of $1 < W2/W1 < 2$.

16 Claims, 15 Drawing Sheets

WAFER FOR MAGNETIC HEAD AND METHOD FOR MANUFACTURING THE SAME

TECHNICAL FIELD

The present invention relates to a wafer for a magnetic head and a method for manufacturing the same.

BACKGROUND OF THE INVENTION

In magnetic heads used in a magnetic disk device, it has been required to reduce the area of a recording magnetic pole appearing on an air bearing surface (ABS) so as to cope with high density recording. Reducing the area of the recording magnetic pole results in the possibility that the recording magnetic pole may collapse during the process of forming the recording magnetic pole on a wafer.

As a means for avoiding such collapsing, therefore, an elongate support part is formed to extend continuously linearly from an ABS part which will appear on the ABS as a pole end face. As seen from above on the wafer midway during the manufacturing process, accordingly, the design of the recording magnetic pole is such that the elongate support part extends straight with the same width as the ABS part.

However, since the shape of the end face appearing on the ABS is determined in a photolithography process for forming the recording magnetic pole, the support part far away from the ABS has a slightly narrow frame-like shape. This results in decreasing the volume of the magnetic pole plating at the narrow, frame-shaped support part far away from the ABS, so that when a magnetic pole forming process such as CMP (chemical mechanical polishing) or milling is performed after the photolithography process, dependency may appear on the pole shape to cause pole missing. The pole missing results in variations in shape on the ABS, causing pole shape anomaly and problems such as open pole resistance or deterioration in resistance distribution, which can lead to a decrease in wafer yield. In the subsequent process (processing), moreover, the processing accuracy can be affected by in-plane pole resistance distribution, which can lead to a decrease in slider yield.

Japanese Unexamined Patent Application Publication No. 2008-181611 discloses that a planar shape of a pattern in a main pole pattern forming process is composed of; a main pole pattern having a narrow tip having a predetermined length and narrowed down from a magnetic field induction part; and a support pattern composed of a first support part having a predetermined width and length and extending from the tip of the main pole pattern with a flare part therebetween and a wider second support part extending from the first support part with another flare part therebetween.

However, since the width of the first support part is 2 to 5 times the width of the tip so as to support the tip, the difference in width between the first support part and the tip is excessively large, so that the shape change point strongly affects and makes unstable the shape of the part which will appear on the ABS as a pole end face. Between them, there is also a difference in resistance to a magnetic pole forming process such as CMP or milling, which can easily cause pole shape anomaly or the like.

SUMMARY OF THE INVENTION

It is an object of the present invention to provide a wafer for a magnetic head in which a magnetic pole is of a design capable of avoiding pole missing due to processing with an improved resistance to the processing during a magnetic pole forming process (polishing or milling) and a method for forming a magnetic pole.

In order to attain the above object, a wafer for a magnetic head according to the present invention comprises a plurality of magnetic head elements, and each magnetic head element has a recording magnetic pole film. The magnetic pole film has a large width part, a small width part and a support part. The small width part projects continuously from the large width part and extends with a constant width W1. The support part is continuous with an end of the small width part and has a width W2 which is larger than the width W1 of the small width part, wherein the width W1 of the small width part and the width W2 of the end satisfy the relationship of $1<W2/W1<2$.

In the wafer for a magnetic head according to the present invention, as described above, the recording magnetic pole film in each magnetic head element has the support part that is continuous with the end of the small width part projecting continuously from the large width part, so that there is obtained a structure in which the small width part, which will serve as a pole end, is supported from both sides with the large width part and the support part. This prevents the small width part, which will serve as a recording pole end, from collapsing during the process of forming the recording magnetic pole on the wafer.

Since the width W1 of the small width part and the width W2 of the end satisfy the relationship of $1<W2/W1<2$, moreover, the influence of the shape changing point between the small width part and the support part can be reduced as compared with the prior art having the relationship of $2 \leq W2/W1 \leq 5$, thereby making it possible to stabilize the shape of the part which will appear on the ABS as a pole end face and also reduce the occurrence of pole shape anomaly or the like with an improved resistance to a magnetic pole forming process such as CMP or milling.

Preferably, the width W1 is in the range of 0.1 µm or less. With this, the magnetic pole can be of a design suitable for high density recording. Also preferably, the width W2 is in the range of 0.08 to 0.12 µm. With this, the rate of pole missing can be reduced.

According to one specific embodiment, the support part may have a width changing part. The width changing part is continuous with the end of the small width part and has its opposite sides in a width direction inclined in such a direction as to increase its width so that as measured at its end, the width satisfies the width W2. With this configuration, since the width changing part provides a system for buffering the change in shape between the small width part and the support part, the influence of the shape changing point between the small width part and the support part can be further reduced to stabilize the shape of the part which will appear on the ABS as a pole end face and further improve a resistance to a magnetic pole forming process such as CMP or milling.

Preferably, the width changing part has an inclination in the range of 10 to 80 degrees. Within this range, the influence of the shape changing point between the small width part and the constant width part can be reduced to stabilize the shape of the part which will appear on the ABS as a pole end face and improve a resistance to a magnetic pole forming process such as CMP or milling.

According to another specific embodiment, the support part may have a width changing part and a constant width part. The width changing part is continuous with the end of the small width part and has its opposite sides in a width direction inclined in such a direction as to increase its width so that as measured at its end, the width satisfies the width W2. The constant width part extends continuously from the end of the width changing part while maintaining the width W2 of the end. With this configuration, the width changing part provides the effect of buffering the change in shape, while the constant width part stabilizes the shape of the part which will appear on the ABS as a pole end face and also reduces the occurrence of pole shape anomaly or the like with an improved resistance to a magnetic pole forming process such as CMP or milling.

According to still another specific embodiment, the support part may have a first support part and a second support part. In this case, the first support part is configured to have a first width changing part and a first constant width part. The first width changing part is continuous with the end of the small width part and has its opposite sides in a width direction inclined in such a direction as to increase its width so that as measured at its end, the width satisfies the width W2. The first constant width part extends continuously from the end of the first width changing part while maintaining the width W2 of the end.

The second support part is configured to have a second width changing part and a second constant width part. The second width changing part is continuous with an end of the first constant width part and has its opposite sides in the width direction inclined in such a direction as to increase its width. The second constant width part extends continuously from an end of the second width changing part while maintaining a width W3 of the end.

With this configuration, since the first support part and the second support part provide a two-stage system for buffering the change in shape between the small width part and the support part, the influence of the shape changing point between the small width part and the support part can be further reduced to stabilize the shape of the part which will appear on the ABS as a pole end face and further improve a resistance to a magnetic pole forming process such as CMP or milling.

Preferably, the recording magnetic pole film is for perpendicular magnetic recording that is suitable for high density recording. In addition, each magnetic head element may have a reproducing element or a plasmon generating element and an optical waveguide beneath the recording magnetic pole film. That is, the present invention is applicable to a magnetic head of a perpendicular magnetic recording system or a thermally-assisted magnetic head.

The present invention also provides a method for manufacturing a wafer having the above recording magnetic pole film.

The other objects, constructions and advantages of the present invention will be further detailed below with reference to the attached drawings. However, the attached drawings show only illustrative examples.

DESCRIPTION OF THE PREFERRED EMBODIMENTS

1. Magnetic Head

Figure 1:
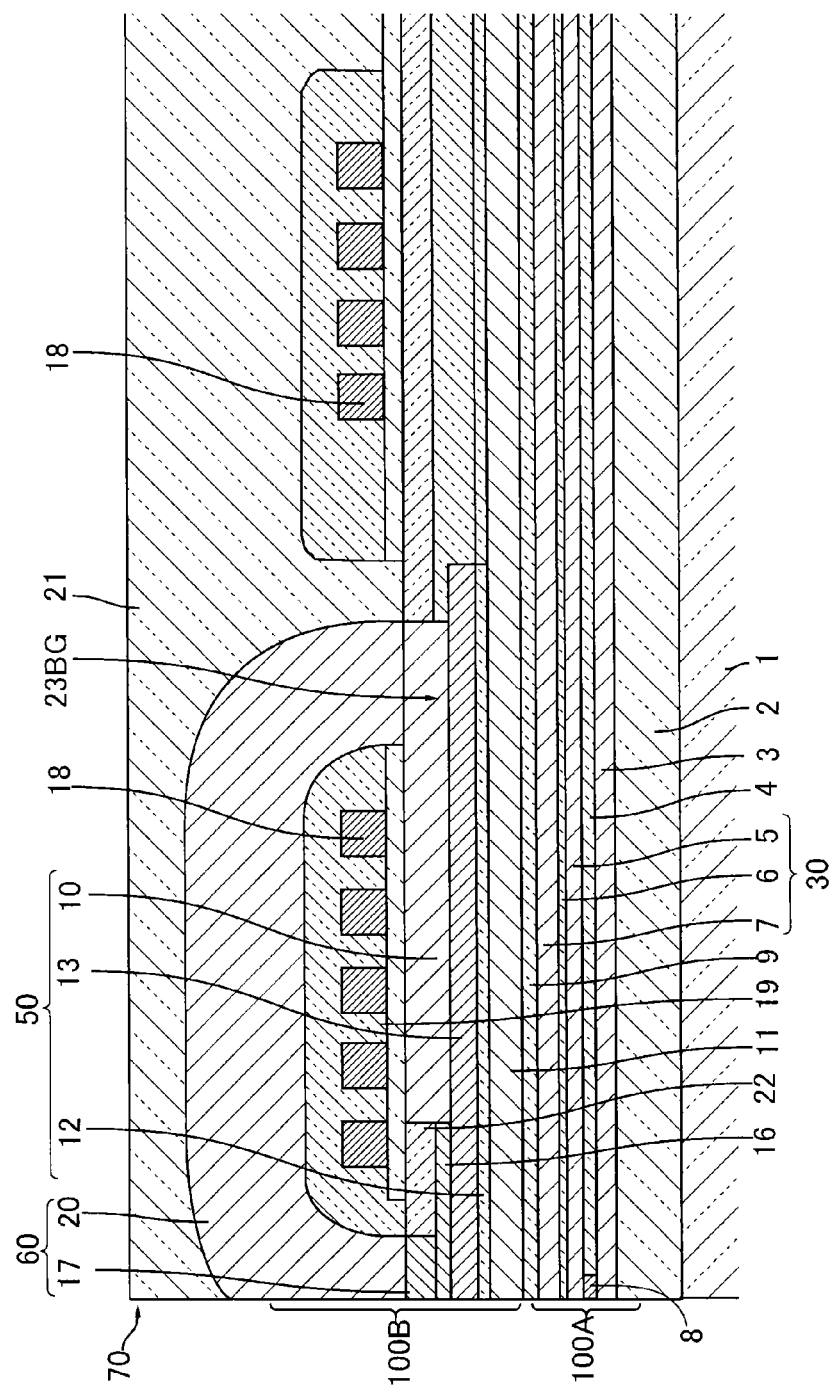
FIG. 1 is an enlarged sectional view showing a part of a magnetic head obtained from a wafer for a magnetic head according to the present invention.
Figure 2:
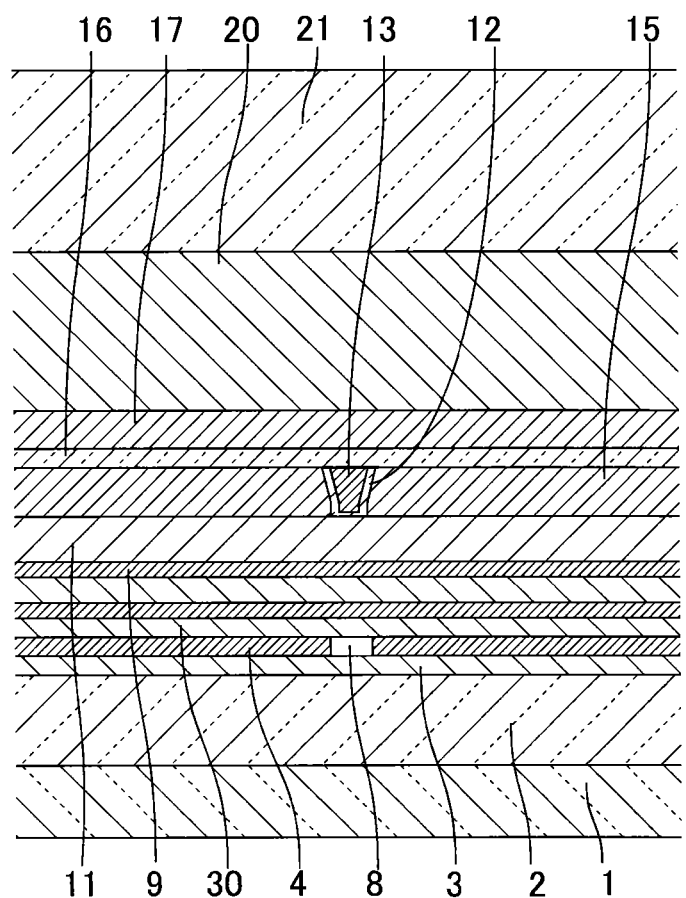
FIG. 2 is an ABS-side end view of the magnetic head shown in FIG. 1.

Referring to FIGS. 1 and 2, there is shown a magnetic head that should be obtained from a wafer for a magnetic head according to the present invention. In the magnetic head, an insulating layer 2, a reproducing head portion 100A for performing a reproducing process using magneto-resistive effect (MR effect), a separating layer 9, a recording head portion 100B for performing a recording process in a perpendicular recording method, and an overcoat layer 21 are stacked in the named order on the slider substrate 1 comprising, for example, a non-magnetic insulating material such as AlTiC.

The insulating layer 2, the separating layer 9 and the overcoat layer 21 comprise, for example, a non-magnetic insulating material such as aluminium oxide ($Al_2O_3$).

The reproducing head portion 100A is formed, for example, by stacking a lower read shield layer 3, a shield gap film 4, and an upper read shield layer 30 in the named order. In the shield gap film 4, a reproducing element 8 is embedded in such a manner as to be exposed on an air bearing surface 70 to be opposed to a recording medium.

Both the lower read shield layer 3 and the upper read shield layer 30 magnetically separate the MR element 8 from the surroundings and extend rearward from the air bearing surface 70. The lower read shield layer 3 comprises, for example, a magnetic material such as a nickel-iron alloy (NiFe (e.g., 80 wt. % of Ni and 20 wt. % of Fe): hereinafter merely referred to as "permalloy (trade name)"). The upper read shield layer 30 is formed, for example, by stacking two upper read shield layer portions 5, 7 with a non-magnetic film 6 interposed therebetween. Both the upper read shield layer portions 5, 7 comprise, for example, a magnetic material such as a permalloy. The non-magnetic film 6 comprises, for example, a non-magnetic material such as ruthenium (Ru) or alumina. The upper read shield layer 30 is not necessarily required to have a multilayer structure but may have a single-layer structure of a magnetic material.

The shield gap film 4 electrically separates the MR element 8 from the surroundings and comprises, for example, a non-magnetic insulating material such as alumina. The MR element 8 uses giant magneto-resistive effect (GMR) or tunneling magneto-resistive effect (TMR), for example.

The recording head portion 100B is, for example, a perpendicular magnetic recording head, i.e., a so-called shield-type head formed by stacking a magnetic pole film 50 embedded in a first support layer 11 and a second support layer 15, a gap film 16 having an opening (back gap 23BG) for magnetic connection, a thin-film coil 18 embedded in an insulating film 19, and a magnetic film 60 in the named order.

The magnetic pole film 50 leads a magnetic flux to the recording medium and, for example, extends rearward from the air bearing surface 70. The magnetic pole film 50 is formed, for example, by stacking an auxiliary magnetic pole film 10, a non-magnetic film 12 and a recording magnetic pole film 13.

The auxiliary magnetic pole film 10, for example, extends from behind the air bearing surface 70 to the back gap 23BG. The auxiliary magnetic pole film 10 is, for example, disposed on the leading side with respect to the recording magnetic pole film 13. The support layer 11 electrically and magnetically separates the auxiliary magnetic pole film 10 from the surroundings and comprises, for example, a non-magnetic insulating material such as alumina.

The non-magnetic film 12 is a first non-magnetic film electrically and magnetically separating the recording magnetic pole film 13 from the surroundings and comprises a non-magnetic insulating material such as alumina or aluminium nitride. However, the range over which the non-magnetic film 12 extends may be set arbitrarily. The section of the non-magnetic film 12 parallel to the air bearing surface 70 is U-shaped, and the recording magnetic pole film 13 is partially embedded in the non-magnetic film 12. Particularly, the non-magnetic film 12 includes a non-magnetic film formed by an ALD process, for example, and has a uniform thickness along the periphery (bottom face and both side faces) of the recording magnetic pole film 13.

The second support layer 15 is embedded outside the non-magnetic film 12 and comprises, for example, a non-magnetic insulating material such as alumina. In the case of employing a side-shield structure, alternatively, it may comprise a magnetic material.

The recording magnetic pole film 13 is a main magnetic flux-emitting portion and extends, for example, from the air bearing surface 70 to the back gap 23BG. Although not illustrated, the recording magnetic pole film 13 includes a seed layer and a plating layer formed on the seed layer. The seed layer is used to let the plating layer grow in a magnetic head manufacturing process and comprises, for example, a magnetic material similar to that of the plating layer. The plating layer comprises, for example, a magnetic material having a high saturation magnetic flux density such as a nickel-iron alloy (FeNi) or an iron-based alloy. Examples of the iron-based alloy include an iron-cobalt alloy (FeCo) and an iron-cobalt-nickel alloy (FeCoNi).

The gap film 16 is a gap for magnetically separating the recording magnetic pole film 13 from the magnetic film 60 and comprises, for example, a non-magnetic insulating material such as alumina or a non-magnetic conductive material such as ruthenium. The gap film 16 has a thickness of about 0.03 μm to 0.1 μm.

The thin-film coil 18 generates a magnetic flux and comprises, for example, a highly conductive material such as copper (Cu). The thin-film coil 18 is wound around the back gap 23BG to have a winding structure (or spiral structure).

The insulating film 19 electrically separates the thin-film coil 18 from the surroundings and comprises, for example, a non-magnetic insulating material such as a photoresist or a spin on glass (SOG) which becomes liquid when heated.

The magnetic film 60 absorbs a spreading component of a magnetic flux emitted from the recording magnetic pole film 13 toward the recording medium so as to increase the gradient of the perpendicular magnetic field and also absorbs a magnetic flux after recording so as to circulate the magnetic flux between the recording head portion 100B and the recording medium. The magnetic film 60, which extends rearward from the air bearing surface 70 on the trailing side of the recording magnetic pole film 13, is separated from the recording magnetic pole film 13 by the gap film 16 at its front but connected to the recording magnetic pole film 13 through the back gap 23BG at its rear. The magnetic film 60 includes, for example, a write shield layer 17 and a return yoke layer 20 which are distinct from each other. The write shield layer 17 mainly has a function of increasing the gradient of the perpendicular magnetic field and comprises, for example, a magnetic material having a high saturation magnetic flux density such as a permalloy or an iron-based alloy. Particularly by absorbing a spreading component of a magnetic flux emitted from the recording magnetic pole film 13, the write shield layer 17 increases the magnetic field gradient of the perpendicular magnetic field, decreases the recording width, and incorporates an oblique magnetic field component into the perpendicular magnetic field. However, the write shield layer 17 may also have a function of circulating the magnetic flux like the return yoke layer 20. The write shield layer 17 is disposed adjacent to the gap film 16 and extends rearward from the air bearing surface 70 to have its rear end adjacent to the insulating film 19.

The return yoke layer 20 has a function of circulating the magnetic flux and comprises, for example, a magnetic material similar to that of the write shield layer 17. The return yoke layer 20 extends from the air bearing surface 70, through above the insulating film 19, to the back gap 23BG on the trailing side of the write shield layer 17 and is connected to the write shield layer 17 at its front but connected to the recording magnetic pole film 13 at its rear through the back gap 23BG.

The overcoat layer 21 protects the magnetic head and comprises, for example, a non-magnetic insulating material such as alumina.

2. Wafer for Magnetic Head

Figure 3:
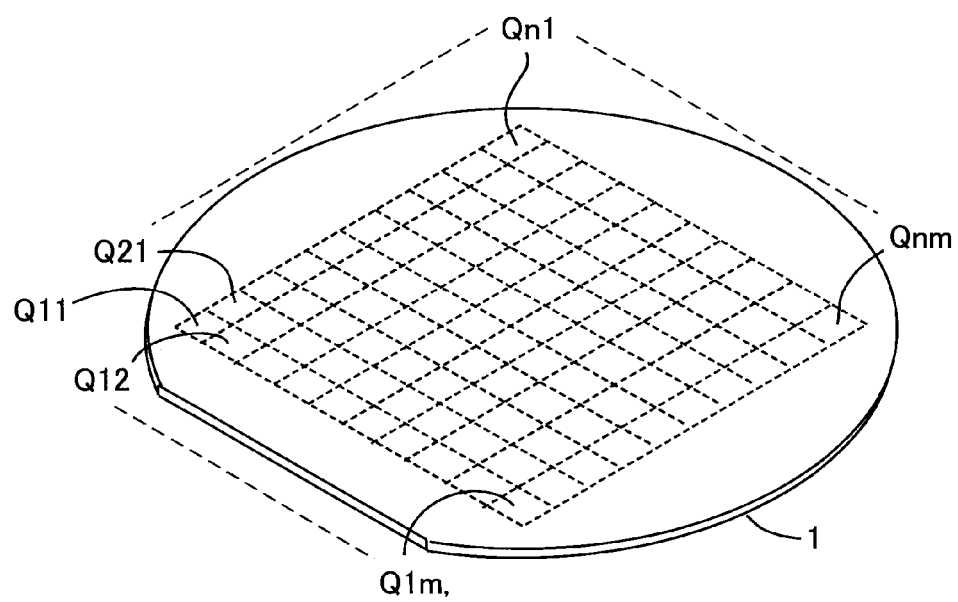
FIG. 3 is a perspective view of a wafer for a magnetic head according to the present invention.
Figure 4:
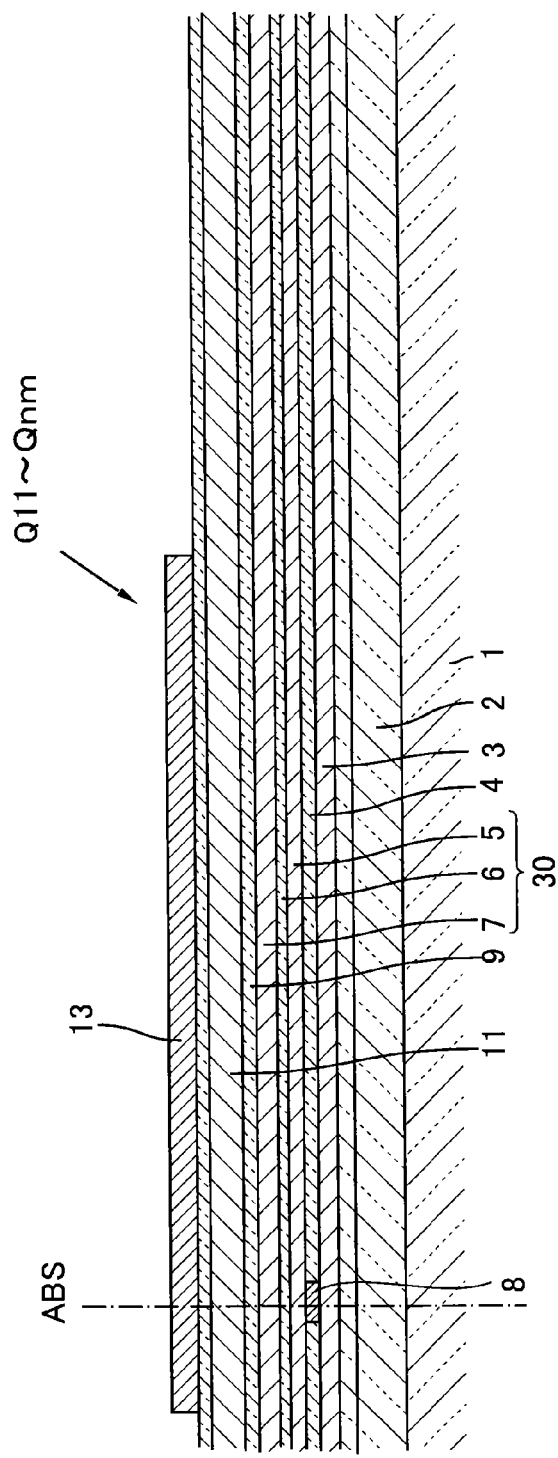
FIG. 4 is an enlarged sectional view showing one of magnetic head elements present in the wafer for a magnetic head shown in FIG. 3.
Figure 5:
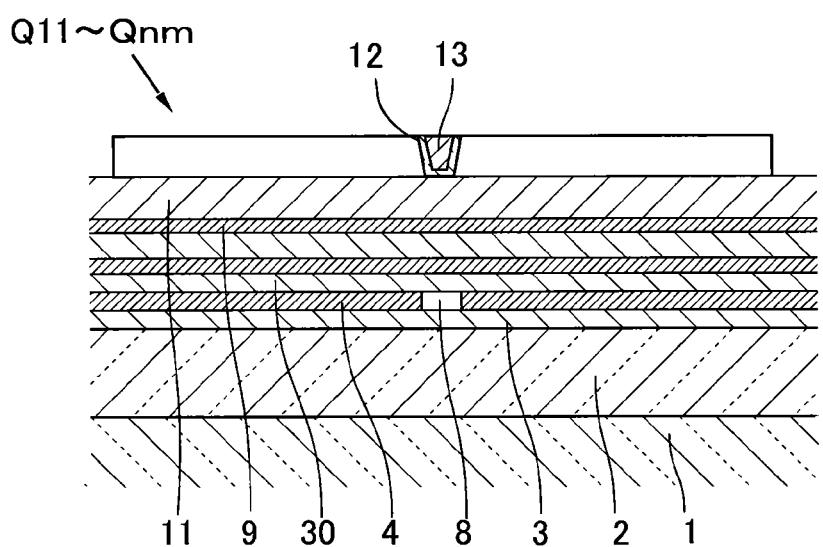
FIG. 5 is a sectional view in which one of the magnetic head elements shown in FIG. 4 is seen from the ABS-side.

Referring to FIG. 3, there is shown a wafer for a magnetic head to be used in the production of the above magnetic head. The wafer has a number of magnetic head elements Q11 to Qnm arranged, for example, in an array of m columns and n rows on one side of a substrate 1 forming the slider substrate shown in FIGS. 1 and 2. As shown in FIGS. 4 and 5, the individual magnetic head elements Q11 to Qnm have a structure in which the insulating layer 2, the lower read shield layer 3, the shield gap film 4, the upper read shield layer portion 5, the non-magnetic film 6, the upper read shield layer 7, the MR element 8, the separating layer 9 and the support layers 11, 12 of the entire magnetic head structure shown in FIGS. 1 and 2 have been already formed on the slider substrate 1.

Figure 6:
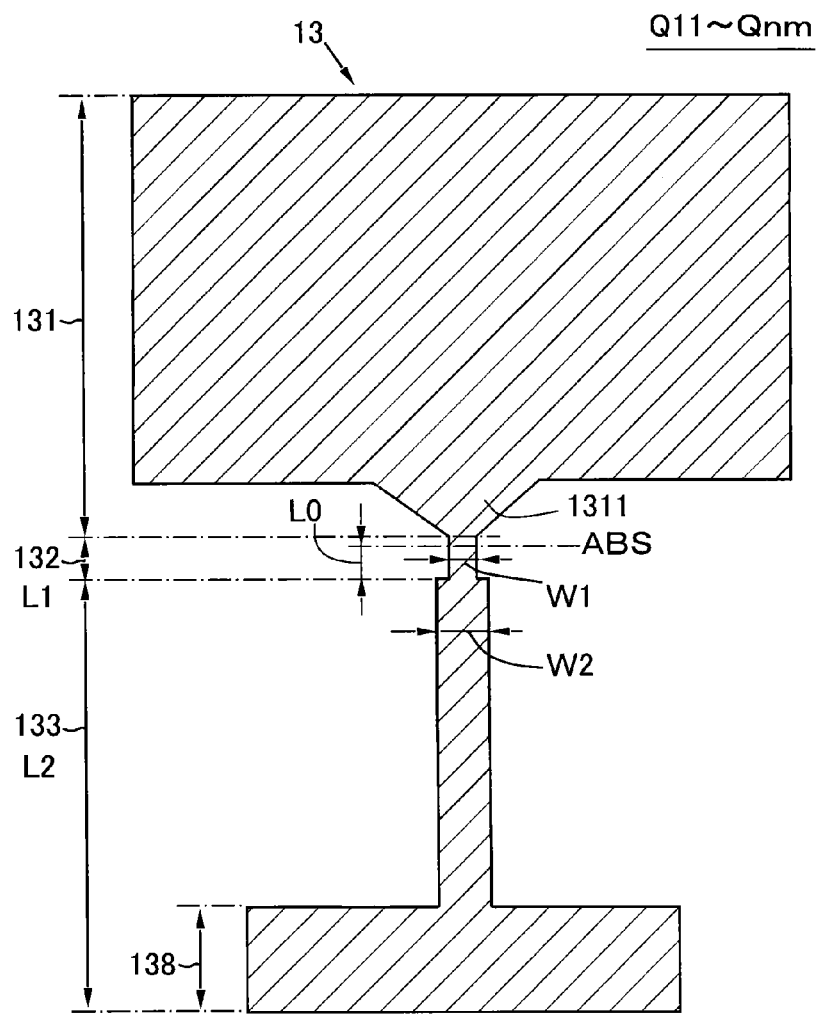
FIG. 6 is an enlarged plan view showing a recording magnetic pole film of the magnetic head element shown in FIGS. 3 and 4.

In the wafer, the recording magnetic pole film 13 is formed on one surface of the support layer 12 such as of alumina appearing at the uppermost layer. As shown in FIG. 6, the recording magnetic pole film 13 has a large width part 131, a small width part 132 and a support part 133. The large width part 131 is a part intended to supply a magnetic flux to the small width part 132, while the small width part 132 projects continuously from the large width part 131 and extends a length L1 with a constant width W1. The width W1 is preferably in the range of 0.1 µm or less. An ABS point is set in the middle of the small width part 132. The small width part 132 may also be referred to as an ABS part, meaning that the ABS point is set in the middle. In a finished product, the ABS point becomes a pole end face appearing on the ABS surface.

In the middle of a front edge of the large width part 131, the illustrated recording magnetic pole film 13 has a flare part 1311, the width of which gradually decreases toward its front end, and the small width part 132 is continuous with the front end of the flare part 1311.

At a shape changing point, the support part 133 is continuous with an end of the small width part 132 but widened from the small width part 132 in a stepwise fashion to have a width W2 which is larger than the width W1 of the small width part 132. The width W2 is preferably in the range of 0.08 to 0.12 µm, wherein the width W1 of the small width part 132 and the width W2 of the end satisfy the relationship of 1<W2/W1<2. On the other hand, a length L0 from the ABS point to the shape changing point is preferably in the range of 0.1 to 1.0 µm, more preferably in the range of 0.3 to 0.9 µm.

In the wafer for a magnetic head according to the present invention, as described above, the recording magnetic pole film 13 in each magnetic head element Q11 to Qnm has the support part 133 that is continuous with the end of the small width part 132 projecting continuously from the large width part 131, so that there is obtained a structure in which the small width part 132, which will serve as a pole end, is supported from both sides with the large width part 131 and the support part 133. This prevents the small width part 132, which will serve as a recording pole end, from collapsing during the process of forming the recording magnetic pole on the wafer.

Since the width W1 of the small width part 132 and the width W2 of the end satisfy the relationship of 1<W2/W1<2, moreover, the influence of the shape changing point between the small width part 132 and the support part 133 can be reduced as compared with the prior art having the relationship of 2=≤W2/W1≤5, thereby making it possible to stabilize the shape of the part which will appear on the ABS as a pole end face and also reduce the occurrence of pole shape anomaly or the like with an improved resistance to a magnetic pole forming process such as CMP or milling.

Figure 7:
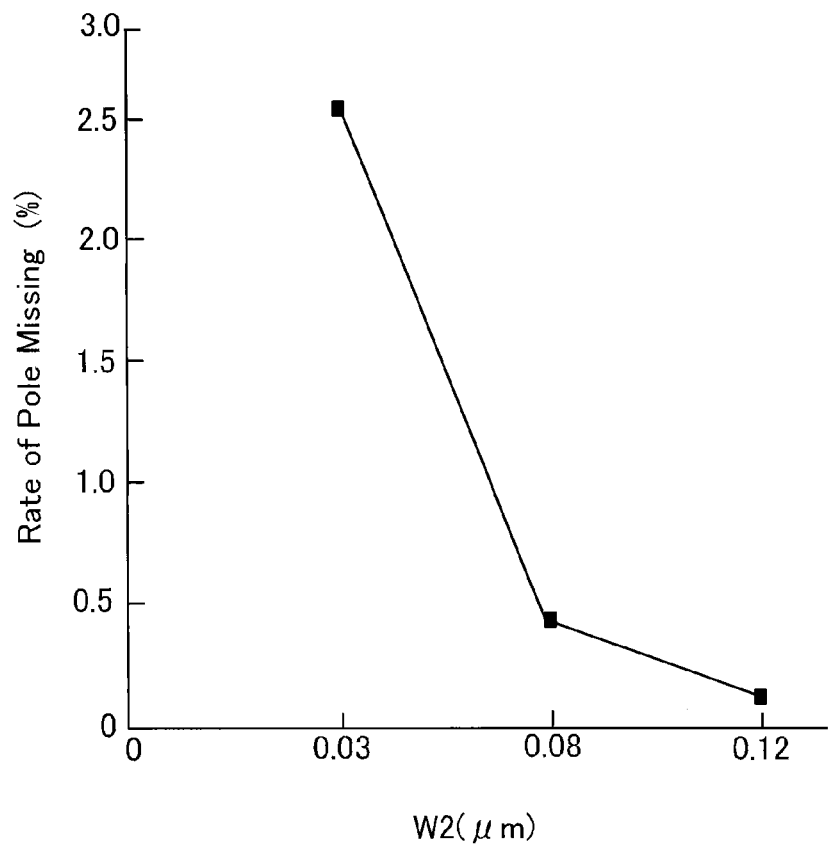
FIG. 7 is a graph showing the relationship between width W2 and rate of pole missing.

The rate of pole missing can be greatly reduced by setting the width W2 within the range of 0.08 to 0.12 µm. For instance, it is seen from FIG. 7 that the pole missing was greatly reduced when the width W2 was in the range of 0.08 to 0.12 µm.

Moreover, the width W1 as measured at the ABS point can be stabilized by setting the length L0 from the ABS point to the shape changing point within the range of 0.1 to 1.0 µm.

In an embodiment where the length L0 from the ABS point to the shape changing point is set to 0.6 µm, for instance, it is found from nano-scale observation of the small width part 132 that the difference between the width W1 at the ABS point and the width W1 at the remaining part other than the ABS point (pole width dependency) was improved from 5 nm of the prior art to 3 nm. It should be noted that in the case of macro-scale observation, the width W1 can be regarded as constant even with such a difference.

Figure 8:
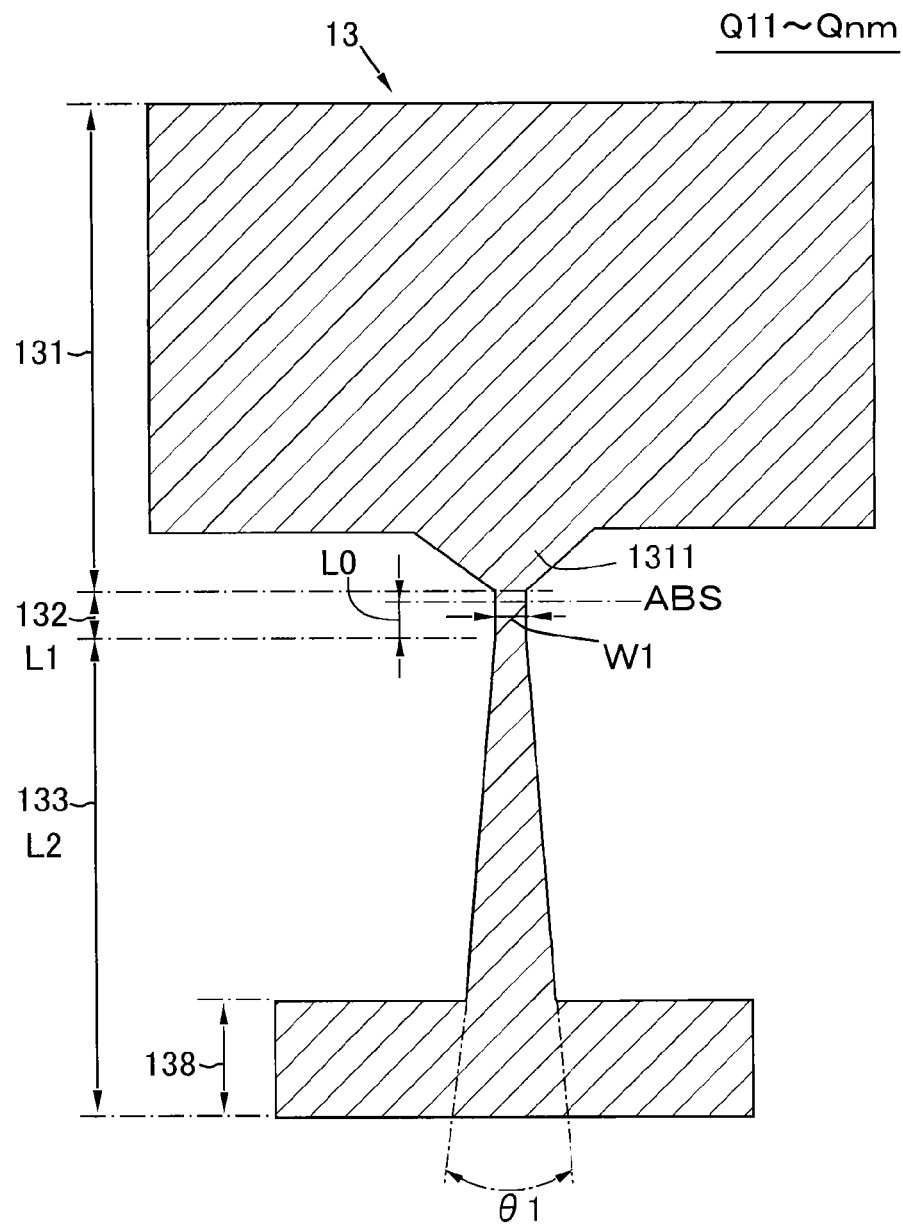
FIG. 8 is an enlarged plan view showing another example of a recording magnetic pole film of the magnetic head element shown in FIGS. 3 and 4.

As shown in FIG. 8, the support part 133 may take the shape in which its opposite sides in a width direction are inclined at an angle θ1 in such a direction as to increase its width.

Figure 9:
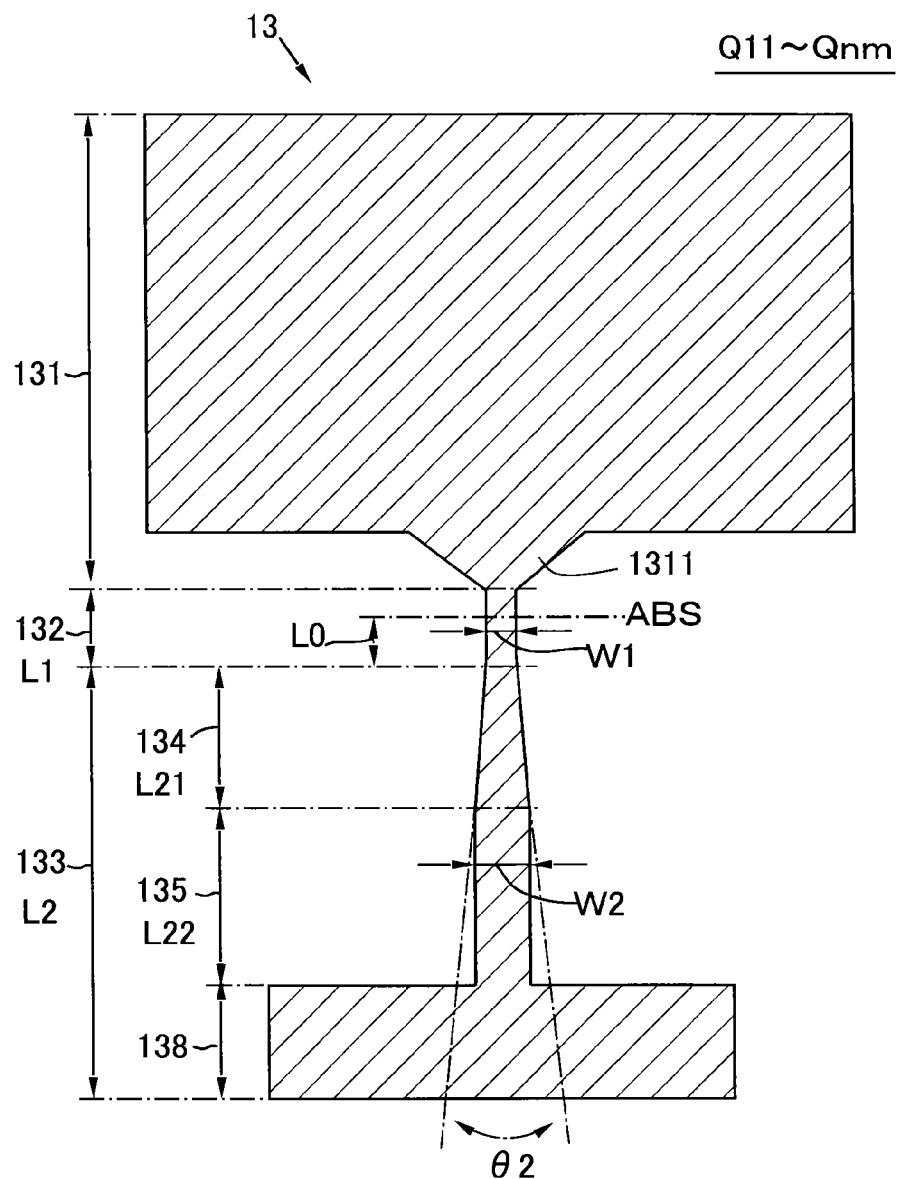
FIG. 9 is an enlarged plan view showing still another example of a recording magnetic pole film of the magnetic head element shown in FIGS. 3 and 4.

As shown in FIG. 9, moreover, the support part 133 may have a width changing part 134 and a constant width part 135. The width changing part 134 is continuous with the end of the small width part 132 and has its opposite sides in the width direction inclined at an angle θ2 in such a direction as to increase its width. The width changing part 134 starts from a point apart from the ABS point by the length L0 and extends a length of L21. The inclination θ2 of the width changing part 134 can be set within the range of 10 to 80 degrees.

The constant width part 135 extends a length L22 continuously from an end of the width changing part 134 while maintaining the width W2 of the end. A terminal part 138 is connected to the constant width part 135. In accordance with the present invention, the width W1 of the small width part 132 and the width W2 of the end (the width of the constant width part 135) satisfy the relationship of 1<W2/W1<2.

In the wafer for a magnetic head shown in FIG. 9, the recording magnetic pole film 13 in each magnetic head element Q11 to Qnm has the width changing part 134 that forms a part of the support part 133 and is continuous with the end of the small width part 132 projecting continuously from the large width part 131 and the constant width part 135 of the support part 133 is continuous with the end of the width changing part 134, so that there is obtained a structure in which the small width part 132, which will serve as a pole end, is supported from both sides with the large width part 131 and the support part 133. This prevents the small width part 132, which will serve as a recording pole end, from collapsing during the process of forming the recording magnetic pole on the wafer.

The width changing part 134 of the support part 133 is continuous with the end of the small width part 132, and its opposite sides in the width direction are inclined in such a direction as to increase the width W1 of the small width part 132 to the width W2. The constant width part 135 is continuous with the end of the width changing part 134 and extends while maintaining the width W2 at the end of the width changing part 134. With this configuration, the step between the small width part 132 and the constant width part 135 can be eliminated and smoothened by the width changing part 134. Therefore, the influence of the shape changing point can be reduced between the small width part 132 and the constant width part 135 forming a major part of the support part 133, thereby making it possible to stabilize the shape of the part which will appear on the ABS as a pole end face and also reduce the occurrence of pole shape anomaly or the like with an improved resistance to a magnetic pole forming process such as CMP or milling.

Furthermore, since the width W1 of the small width part 132 and the width W2 of the constant width part 135 satisfy the relationship of 1<W2/W1<2, it is possible to stabilize the shape of the part which will appear on the ABS as a pole end face and further improve a resistance to a magnetic pole forming process such as CMP or milling so as to avoid the pole missing during the process.

Figure 10:
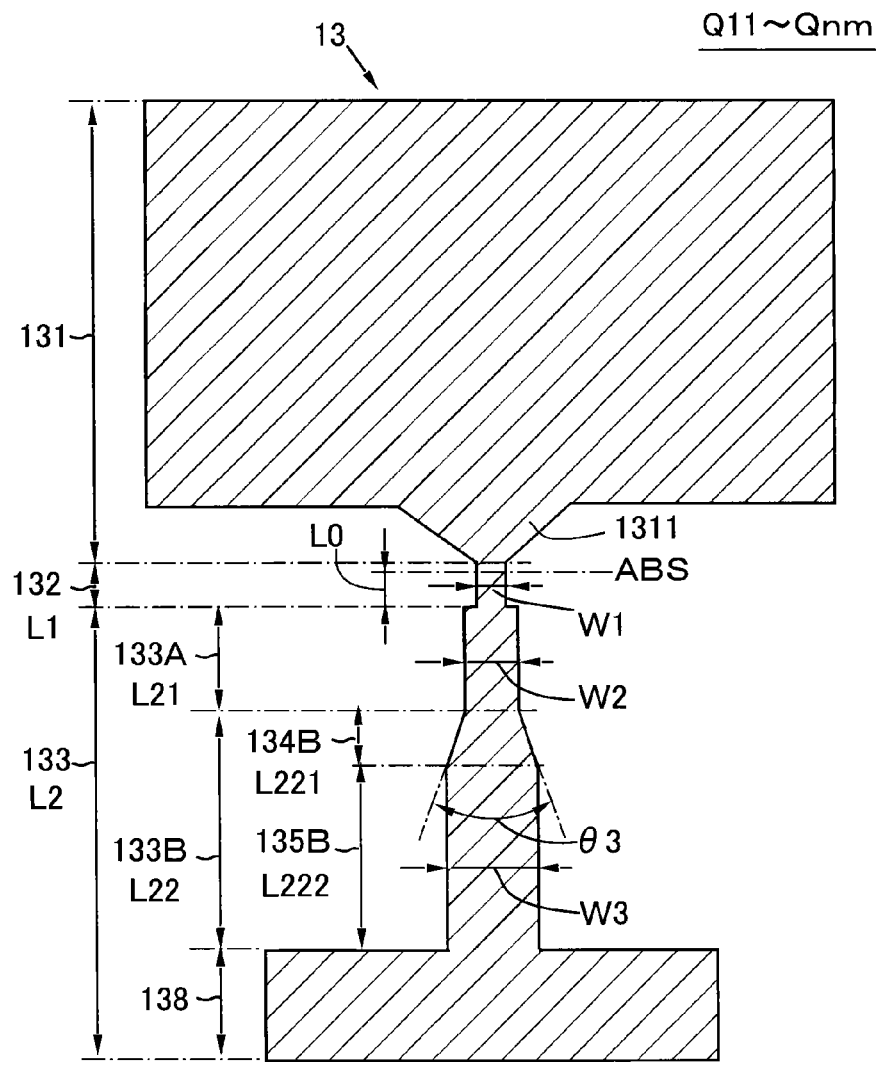
FIG. 10 is an enlarged plan view showing yet another example of a recording magnetic pole film of the magnetic head element shown in FIGS. 3 and 4.

In the next embodiment shown in FIG. 10, the support part 133 has a first support part 133A and a second support part 133B. The first support part 133A is widened from the end of the small width part 132 in a stepwise fashion and extends a length L21 with a constant width W2.

The second support part 133B has a second width changing part 134B, while the rest is a second constant part 135B. The second width changing part 134B extends a length L221 continuously from an end of the first support part 133A such that its opposite sides in the width direction are inclined at an angle θ3 in such a direction as to increase the width. The second constant width part 135B extends a length L222 continuously from an end of the second width changing part 134B while maintaining a width W3 of the end. The terminal part 138 is continuous with the second support part 133B.

With this configuration, since the first support part 133A and the second support part 133B provide a two-stage system for buffering the change in shape with the small width part 132, the influence of the shape changing point between the small width part 132 and the support part 133 can be further reduced to stabilize the shape of the part which will appear on the ABS as a pole end face and further improve a resistance to a magnetic pole forming process such as CMP or milling.

As described above, the width W1 is preferably in the range of 0.1 μm or less, the width W2 is preferably in the range of 0.08 to 0.12 μm, the length L0 from the ABS point is preferably in the range of 0.1 to 1.0 μm, particularly, in the range of 0.3 to 0.9 μm, the inclination θ3 of the second width changing part 134B can be set within the range of 10 to 80 degrees, the length L221 of the second width changing part 134B is preferably 35 nm or more, and the width W1 of the small width part 132 and the width W2 satisfy the relationship of 1<W2/W1<2.

Figure 11:
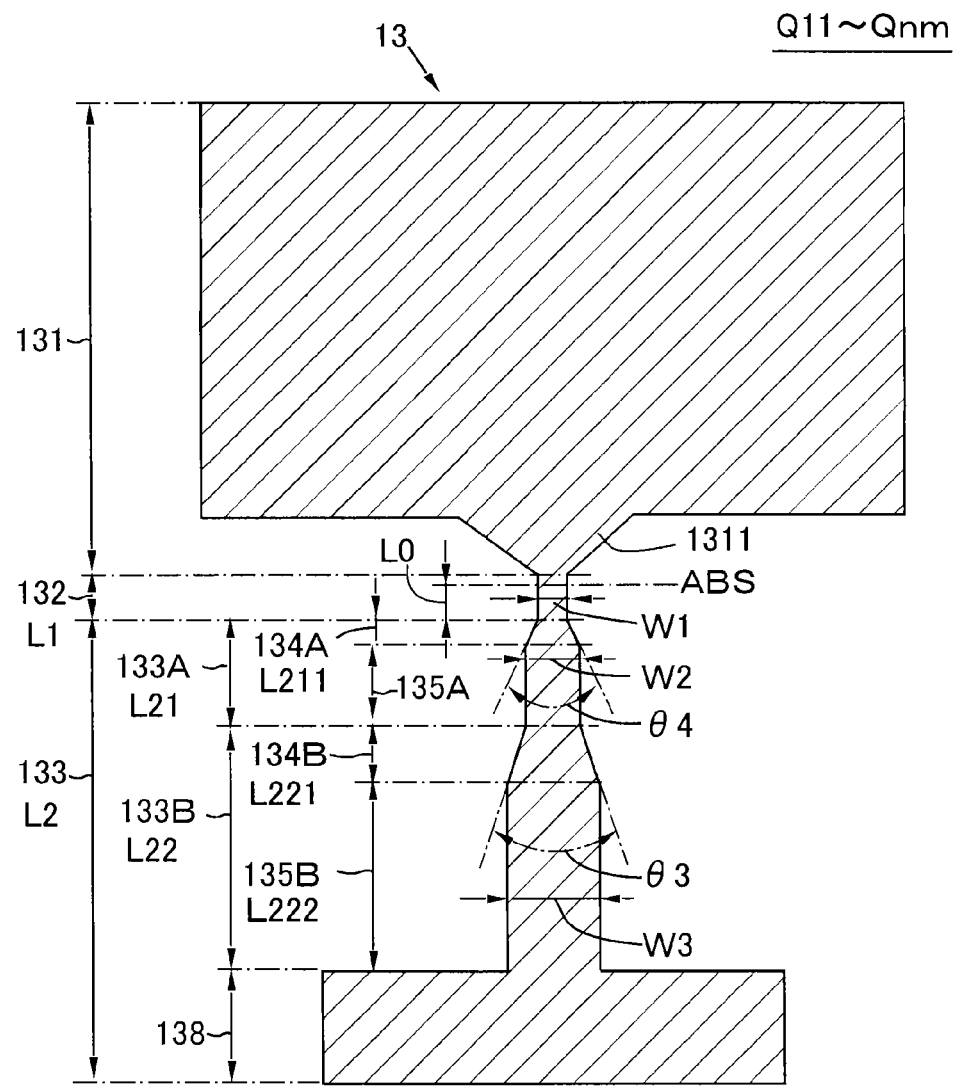
FIG. 11 is an enlarged plan view showing yet another example of a recording magnetic pole film of the magnetic head element shown in FIGS. 3 and 4.

Moreover, FIG. 11 shows an embodiment which is identical to the embodiment of FIG. 8 in that the support part 133 has the first support part 133A and the second support part 133B but differs from the embodiment of FIG. 8 in that the first support part 133A has a first width changing part 134A and a first constant width part 135A. The first width changing part 134A extends a length L211 continuously from the end of the small width part 132 such that its opposite sides in the width direction are inclined at an angle θ4 in such a direction as to increase the width.

With this configuration, since the width changing parts 134A, 134B provide a two-stage system for buffering the change in shape between the small width part 132 and the first support part 133A and between the first support part 133A and the second support part 133B, respectively, the influence of the shape changing point between the small width part 132 and the support part 133 can be further reduced to stabilize the shape of the part which will appear on the ABS as a pole end face and further improve a resistance to a magnetic pole forming process such as CMP or milling.

As described above, the width W1 is preferably in the range of 0.1 μm or less, the width W2 is preferably in the range of 0.08 to 0.12 μm, the length L0 from the ABS point is preferably in the range of 0.1 to 1.0 μm, particularly, in the range of 0.3 to 0.9 μm, the inclination θ3 of the second width changing part 134B can be set within the range of 10 to 80 degrees, the length L221 of the second width changing part 134B is preferably 35 nm or more, and the width W1 of the small width part 132 and the width W2 satisfy the relationship of 1<W2/W1<2. Preferably, the recording magnetic pole film 13 is for perpendicular magnetic recording that is suitable for high density recording. In addition, each magnetic head element may have a reproducing element or a plasmon generating element and an optical waveguide beneath the recording magnetic pole film 13. That is, the present invention is applicable to a magnetic head of a perpendicular magnetic recording system or a thermally-assisted magnetic head.

The following description will be made with reference to a concrete example. In the embodiment of FIG. 11, the constants of the recording magnetic pole 13 were set as follows.
W1=0.06 μm
W2=0.11 μm
L0=0.60 μm
W3=3.80 μm With the above recording magnetic pole film 13, the following effects were obtained as compared with the design dimensions of the conventional recording magnetic pole 13 (W1=0.06 μm, W2=0.03 μm, W3=3.80 μm).
(1) The pole missing rate was improved from 2.53% of the prior art to 0.13%.
(2) The pole resistance was improved from 198Ω of the prior art to 127 Ω.

The "pole resistance" as used herein refers to an electric resistance of the small width part 132. The electric resistance is characterized by being in inverse proportion to the sectional area of a resistive object, which means that the larger the pole resistance is, the thinner the recording magnetic pole is, so that the pole missing can easily occur. In the present embodiment, on the other hand, the width W2 was improved to have a lower pole resistance as compared with the prior art, which means that the chance of causing the pole missing was reduced.
(3) The pole width dependency was improved from 5 nm to 3 nm.

The improvement in pole width dependency means that the small width part 132 was improved in linearity when the small width part 132 was observed in nano-scale.
(4) The rate of occurrence of elements having abnormal characteristics during the processing of the slider was improved from 0.34% of the prior art to 0.25%.
(5) The rate of occurrence of elements having a small pole during the processing of the slider was improved from 62% of the prior art to 17%.

From the above results, it is apparent that the ABS shape was stabilized and controllability was improved to enable improvement of wafer yield at the time of mass production, improvement of production efficiency by the stabilized process, and improvement of yield during the processing of the slider.

3. Method for Manufacturing Wafer for Magnetic Head

Next will be described a method for manufacturing the foregoing wafer for a magnetic head. Basically, the magnetic head can be manufactured by forming and stacking a series of components in order using a conventional thin-film process including a film formation technique such as plating or sputtering, a patterning technique such as photolithography, an etching technique such as dry etching or wet etching, and a polishing technique such as chemical mechanical polishing (CMP).

Referring to FIGS. 3 to 5, the reproducing head portion (see FIG. 1) is formed such that at first, the insulating layer 2 is formed on the slider substrate 1, and then the lower read shield layer 3, the shield gap film 4 embedded with the MR element 8 and the upper read shield layer 30 (the upper read shield layer portions 5, 7 and the non-magnetic film 6) are stacked on the insulating layer 2 in the named order.

Then, after the separating layer 9 is formed on the reproducing head portion, the support layer 11 is formed on the separating layer 9.

Figure 12:
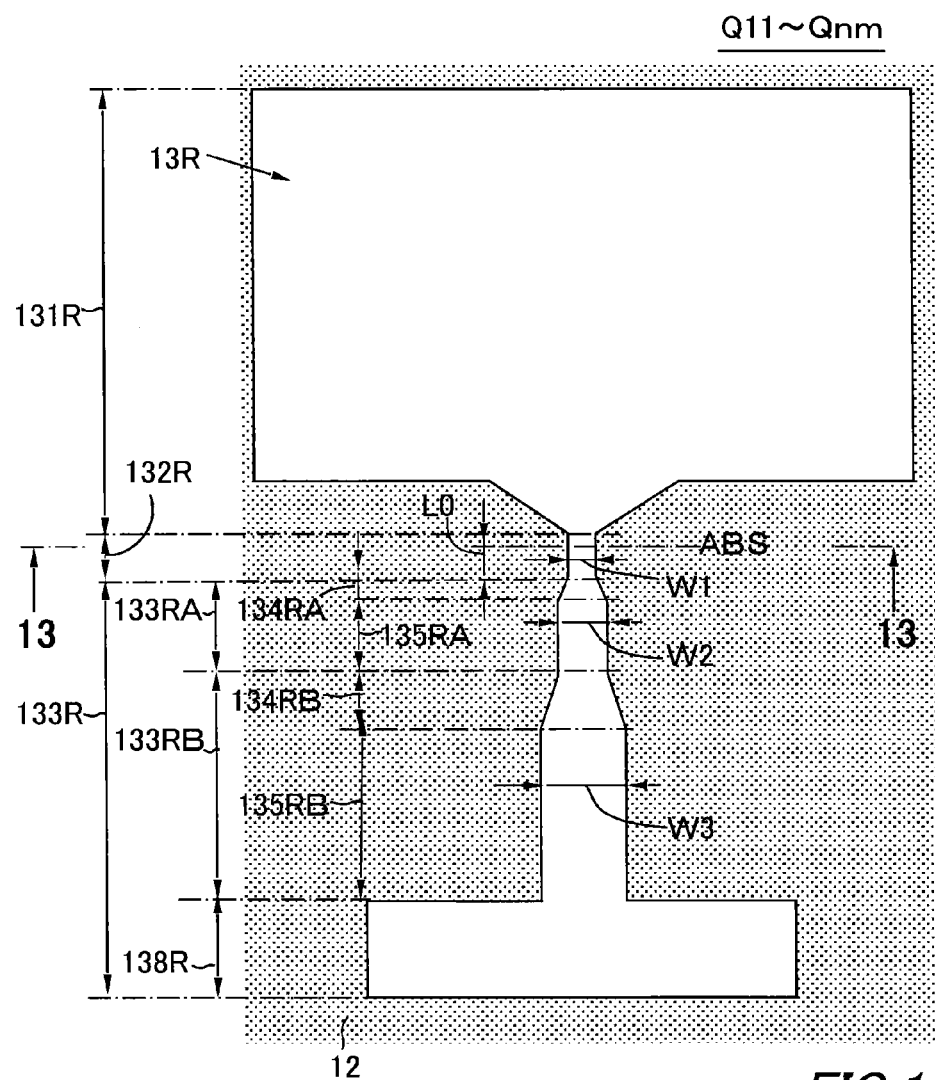
FIG. 12 is a plan view showing a process of manufacturing a wafer for a magnetic head having the recording magnetic pole film shown in FIG. 11.
Figure 13:
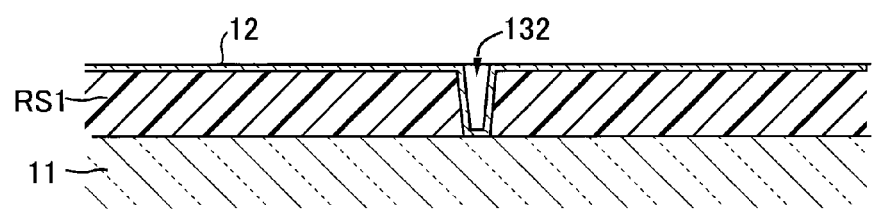
FIG. 13 is a sectional view taken along the line 13-13 in FIG. 12.

Then, a pattern for a recording magnetic pole is formed with a resistmask RS1, as shown in FIGS. 12 and 13, by performing a photolithography process, a sputtering process or the like on the support layer 11. In FIGS. 12 and 13, the non-magnetic film 12 comprising a non-magnetic material such as alumina or aluminium nitride has been already formed on the surface of the resistmask RS1.

FIGS. 12 and 13 show a pattern for forming the recording magnetic pole film shown in FIG. 11. Thus, cut-out patterns 131R, 132R, 133R defined by the resistmask RS1 correspond to the large width part 131, the small width part 132 and the support part 133 of the recording magnetic pole film shown in FIG. 11. The other reference symbols to which the reference symbol R is added also correspond to the reference symbols in FIG. 11 from which the reference symbol R is removed.

Figure 14:
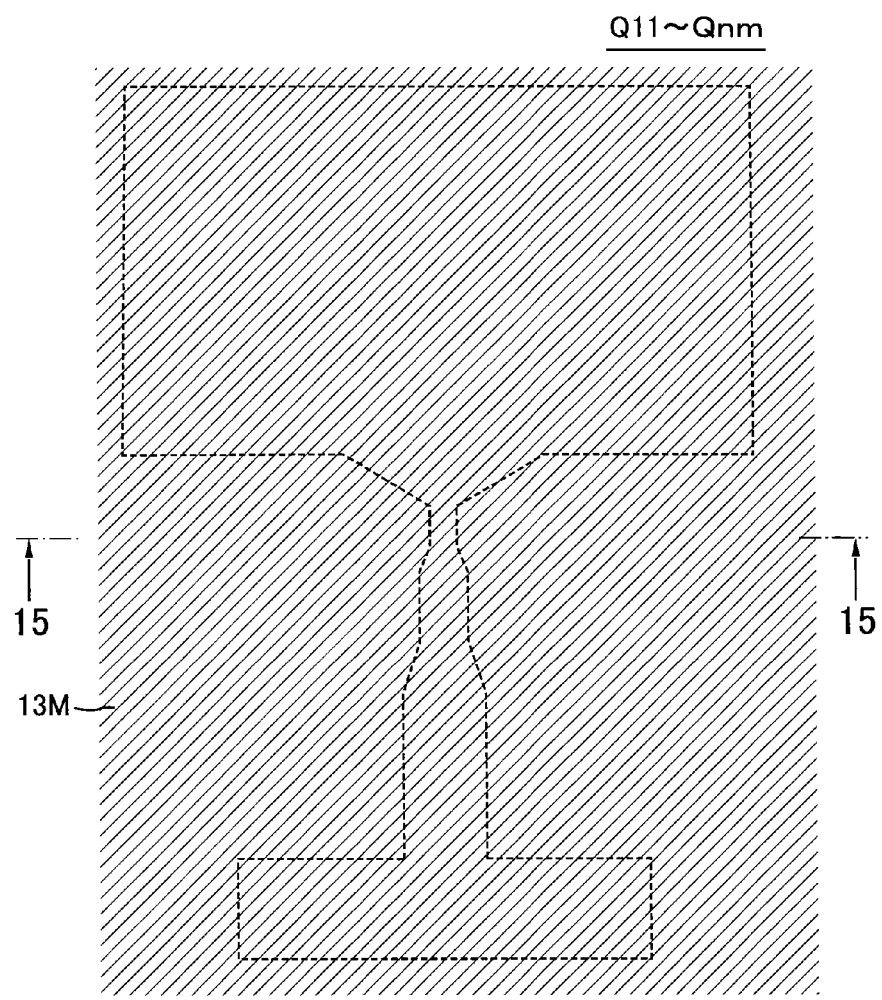
FIG. 14 is a drawing showing a process after the process shown in FIG. 12.
Figure 15:
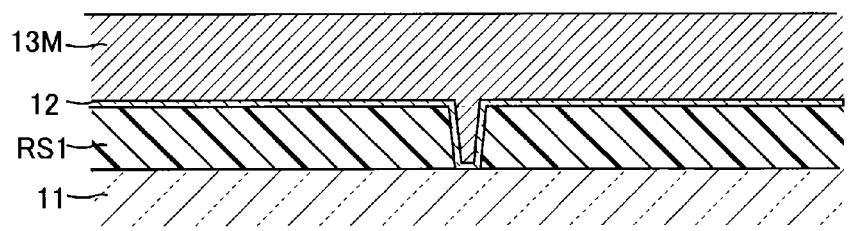
FIG. 15 is a sectional view taken along the line 15-15 in FIG. 14.

Then, as shown in FIGS. 14 and 15, a magnetic film 13M for a recording magnetic pole film is applied by plating inside and outside the pattern defined by the resistmask RS1. Prior to plating, an electrode film for plating should be formed on the surface of the non-magnetic film 12 such as by sputtering.

Figure 16:
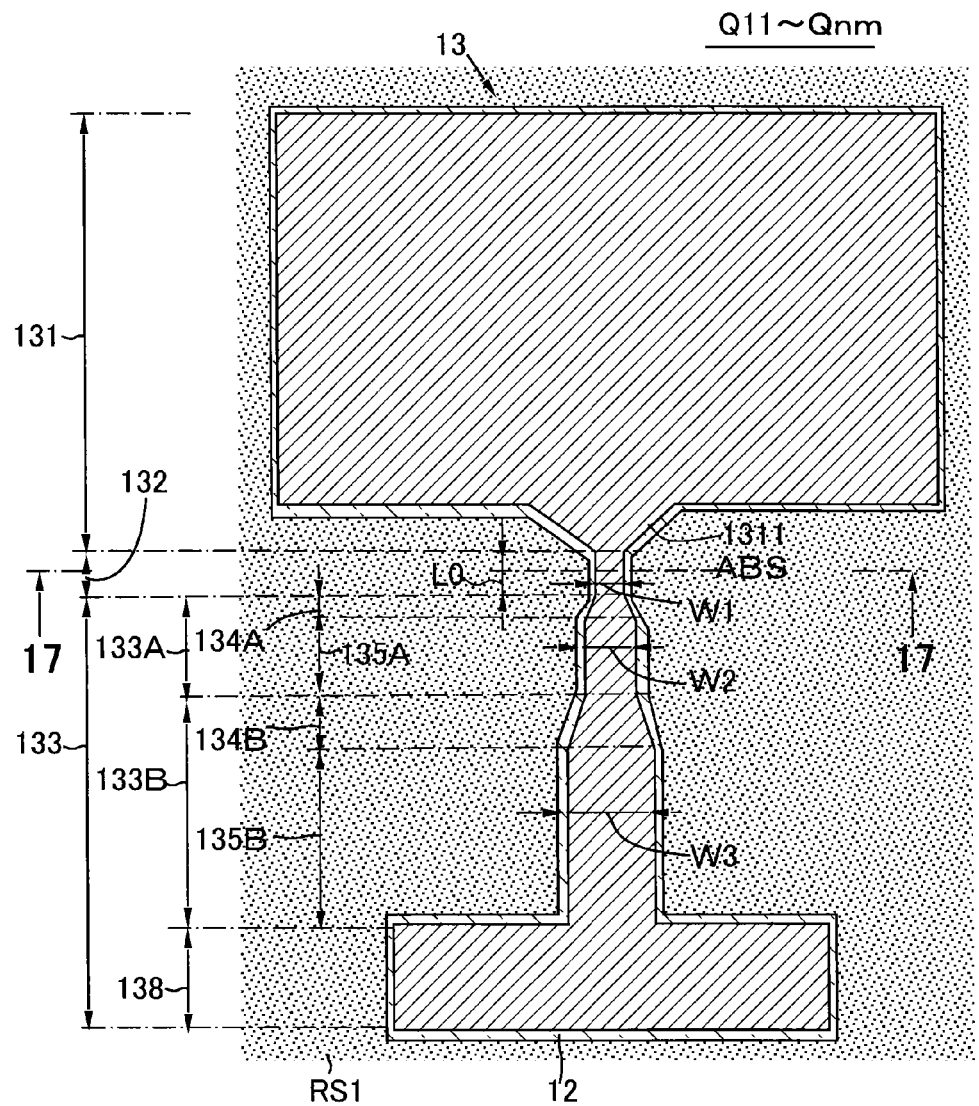
FIG. 16 is a drawing showing a process after the process shown in FIGS. 14 and 15.
Figure 17:
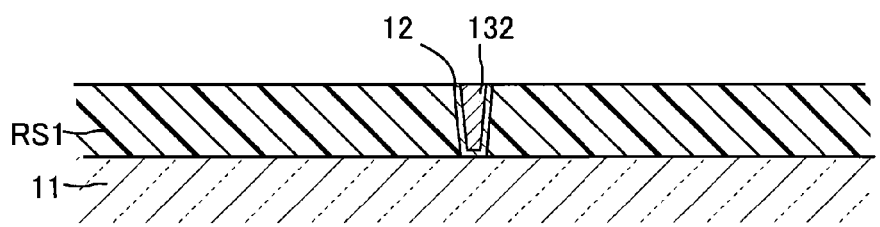
FIG. 17 is a sectional view taken along the line 17-17 in FIG. 16.

Then, a flattening process is performed on the magnetic film 13M. CMP can be used for the flattening process. Thus, the recording magnetic pole film 13 can be exposed in a predetermined pattern with the bottom and side surfaces covered with the non-magnetic film 12, as shown in FIGS. 16 and 17.

Figure 18:
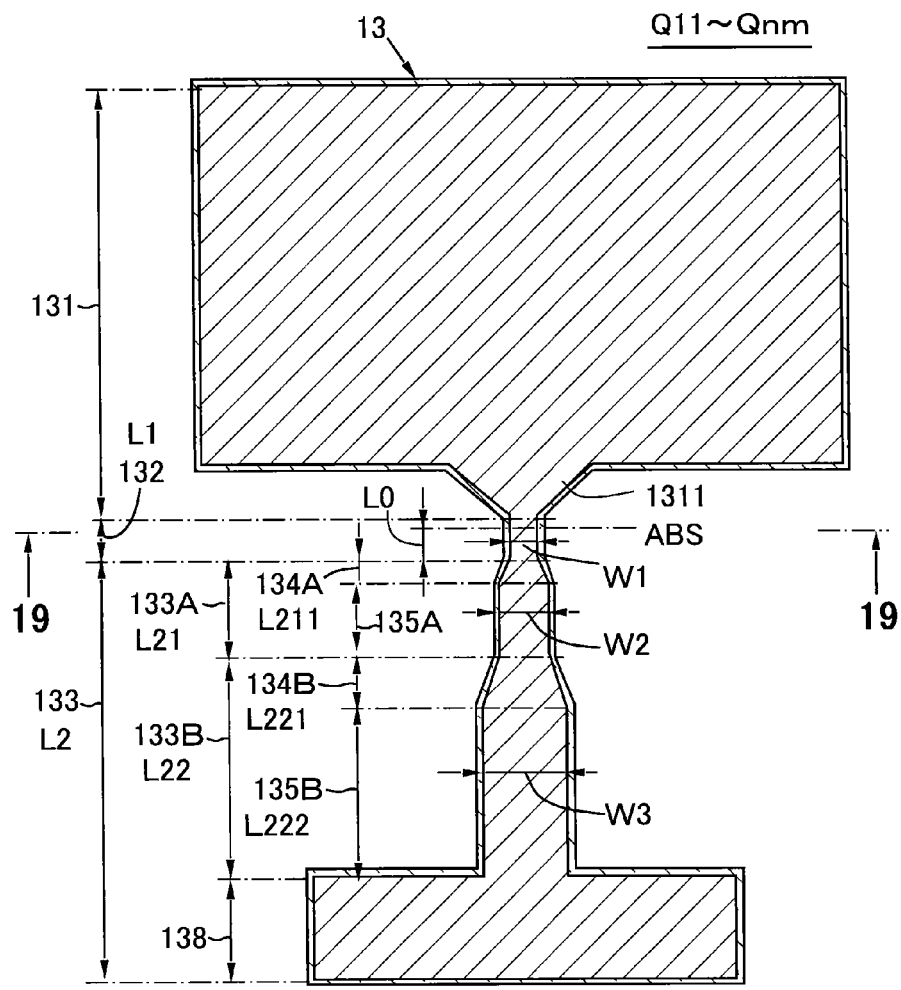
FIG. 18 is a drawing showing a process after the process shown in FIGS. 16 and 17.
Figure 19:
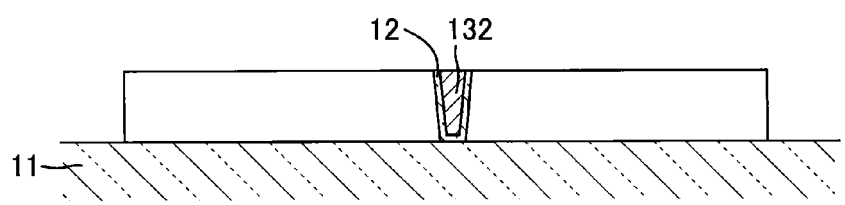
FIG. 19 is a sectional view taken along the line 19-19 in FIG. 18.

Then, the resistmask RS1 is removed by chemical etching or the like, as shown in FIGS. 18 and 19. Thus, the recording magnetic pole film 13 described with reference to FIG. 11 can be obtained, as shown in FIGS. 18 and 19.

In order to obtain the magnetic head shown in FIGS. 1 and 2, thereafter, the gap film 16, the insulating film 19, the thin-film coil 18 and the magnetic film 60 (the write shield layer 17 and the return yoke layer 20) are further stacked in a predetermined order, thereby forming the recording head portion 100B. Finally, the overcoat layer 21 is formed on the recording head portion 100B. Thus, the wafer for a magnetic head is almost completed. In order to obtain the single magnetic head shown in FIGS. 1 and 2, then, a wafer cutting process, a polishing process and so on should be performed.

The present invention has been described in detail above with reference to preferred embodiments. However, obviously those skilled in the art could easily devise various modifications of the invention based on the technical concepts underlying the invention and teachings disclosed herein.

What is claimed is:

1. A wafer for a magnetic head comprising a plurality of magnetic head elements, each magnetic head element having a recording magnetic pole film, the magnetic pole film having a large width part, a small width part and a support part, the small width part projecting from the large width part and extending with a constant width W1, the support part being continuous with an end of the small width part and having a width W2 which is larger than the width W1 of the small width part, the width W1 of the small width part and the width W2 of the end satisfying the relationship of 1<W2/W1<2.

2. The wafer for a magnetic head as claimed in claim 1, wherein the support part has a width changing part, the width changing part being continuous with the end of the small width part and having its opposite sides in a width direction inclined in such a direction as to increase its width so that as measured at its end, the width satisfies the width W2.

3. The wafer for a magnetic head as claimed in claim 1, wherein the support part has a width changing part and a constant width part, the width changing part being continuous with the end of the small width part and having its opposite sides in a width direction inclined in such a direction as to increase its width so that as measured at its end, the width satisfies the width W2, the constant width part extending continuously from the end of the width changing part while maintaining the width W2 of the end.

4. The wafer for a magnetic head as claimed in claim 1, wherein the support part has a first support part and a second support part, the first support part having a first width changing part and a first constant width part, the first width changing part being continuous with the end of the small width part and having its opposite sides in a width direction inclined in such a direction as to increase its width so that as measured at its end, the width satisfies the width W2, the first constant width part extending continuously from the end of the first width changing part while maintaining the width W2 of the end, the second support part having a second width changing part and a second constant width part, the second width changing part being continuous with an end of the first constant width part and having its opposite sides in the width direction inclined in such a direction as to increase its width, the second constant width part extending continuously from an end of the second width changing part while maintaining a width W3 of the end.

5. The wafer for a magnetic head as claimed in claim 1, wherein the width W1 is equal to or less than 0.1 µm.

6. The wafer for a magnetic head as claimed in claim 1, wherein the width W2 is in the range of 0.08 to 0.12 µm.

7. The wafer for a magnetic head as claimed in claim 1, wherein the recording magnetic pole film is for perpendicular magnetic recording.

8. The wafer for a magnetic head as claimed in claim 1, wherein each magnetic head element has a plasmon generating element, an optical waveguide and a reproducing element beneath the recording magnetic pole film.

9. A method for manufacturing a wafer for a magnetic head having a plurality of magnetic head elements, comprising the step of forming a recording magnetic pole film having a large width part, a small width part and a support part, the small width part projecting continuously from the large width part and extending with a constant width W1, the support part being continuous with an end of the small width part and having a width W2 which is larger than the width W1 of the small width part, the width W1 of the small width part and the width W2 of the end satisfying the relationship of 1<W2/W1<2.

10. The method as claimed in claim 9, wherein the support part has a width changing part, the width changing part being continuous with the end of the small width part and having its opposite sides in a width direction inclined in such a direction as to increase its width so that as measured at its end, the width satisfies the width W2.

11. The method as claimed in claim 9, wherein the support part has a width changing part and a constant width part, the width changing part being continuous with the end of the small width part and having its opposite sides in a width direction inclined in such a direction as to increase its width so that as measured at its end, the width satisfies the width W2, the constant width part extending continuously from the end of the width changing part while maintaining the width W2 of the end.

12. The method as claimed in claim 9, wherein the support part has a first support part and a second support part, the first support part having a first width changing part and a first constant width part, the first width changing part being continuous with the end of the small width part and having its opposite sides in a width direction inclined in such a direction as to increase its width so that as measured at its end, the width satisfies the width W2, the first constant width part extending continuously from the end of the first width changing part while maintaining the width W2 of the end, the second support part having a second width changing part and a second constant width part, the second width changing part being continuous with an end of the first constant width part and having its opposite sides in the width direction inclined in such a direction as to increase its width, the second constant width part extending continuously from an end of the second width changing part while maintaining a width W3 of the end.

13. The method as claimed in claim 9, wherein the width W1 is equal to or less than 0.1 μm.

14. The method as claimed in claim 9, wherein the width W2 is in the range of 0.08 to 0.12 μm.

15. The method as claimed in claim 9, wherein the recording magnetic pole film is for perpendicular magnetic recording.

16. The method as claimed in claim 9, wherein each magnetic head element has a plasmon generating element, an optical waveguide and a reproducing element beneath the recording magnetic pole film.

* * * * *